United States Patent
Ludwig et al.

(10) Patent No.: US 10,674,451 B2
(45) Date of Patent: *Jun. 2, 2020

(54) POWER SENSITIVE WIRELESS COMMUNICATION RADIO MANAGEMENT

(71) Applicant: Google LLC, Mountain View, CA (US)

(72) Inventors: Peter Wilhelm Ludwig, San Francisco, CA (US); Jiahu Deng, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/835,737

(22) Filed: Dec. 8, 2017

(65) Prior Publication Data

US 2018/0103432 A1    Apr. 12, 2018

Related U.S. Application Data

(63) Continuation of application No. 14/958,902, filed on Dec. 3, 2015, now Pat. No. 9,854,529.

(51) Int. Cl.
*H04W 52/02* (2009.01)
*H04M 1/725* (2006.01)
*H04W 4/80* (2018.01)

(52) U.S. Cl.
CPC ..... *H04W 52/0254* (2013.01); *H04M 1/7253* (2013.01); *H04W 4/80* (2018.02);
(Continued)

(58) Field of Classification Search
CPC ......... H04W 52/0254; H04W 52/0245; H04W 52/0258; H04W 4/80; H04M 1/7253;
(Continued)

(56) References Cited

U.S. PATENT DOCUMENTS 8,170,606 B2    5/2012   Dorsey et al.
8,380,999 B1 *  2/2013   Robison ............ H04W 52/0261
                                              713/300
(Continued)

FOREIGN PATENT DOCUMENTS

KR    10-2012-0095576 A    8/2012
KR    10-2013-0072529 A    7/2013
(Continued)

OTHER PUBLICATIONS

Notice of Office Action, and translation thereof, from counterpart Korean Application No. 10-2018-7007541, dated Feb. 7, 2019, 12 pp.

(Continued)

*Primary Examiner* — Habte Mered
(74) *Attorney, Agent, or Firm* — Shumaker & Sieffert, P.A.

(57) ABSTRACT

In one example, a wearable device includes one or more processors, a plurality of communication components, one or more motion sensors configured to detect motion of the wearable device and generate, based on the detected motion, motion data, and a storage device configured to store at least one module. The at least one module may be operable by the one or more processors to: responsive to determining that the wearable device is not connected to the computing device using the first communication technology, determine, based on the motion data, whether the wearable device is currently being worn, and responsive to determining that the wearable device is currently being worn, establish the wireless connection to the computing device using the second communication component.

17 Claims, 5 Drawing Sheets

(52) U.S. Cl.
CPC ... *H04W 52/0245* (2013.01); *H04W 52/0258* (2013.01); *Y02D 70/1262* (2018.01); *Y02D 70/142* (2018.01); *Y02D 70/144* (2018.01); *Y02D 70/164* (2018.01); *Y02D 70/166* (2018.01); *Y02D 70/26* (2018.01)

(58) Field of Classification Search
CPC .. Y02D 70/26; Y02D 70/142; Y02D 70/1262; Y02D 70/144; Y02D 70/164; Y02D 70/166
See application file for complete search history.

(56) References Cited

U.S. PATENT DOCUMENTS

| | | | |
|---|---|---|---|
| 9,674,707 | B2 | 6/2017 | Boettcher et al. |
| 2011/0185183 | A1 | 7/2011 | Yamamoto |
| 2011/0207509 | A1 | 8/2011 | Crawford |
| 2012/0324259 | A1 | 12/2012 | Aasheim et al. |
| 2014/0006510 | A1 | 1/2014 | Hamilton et al. |
| 2014/0106677 | A1 | 4/2014 | Altman |
| 2014/0274056 | A1 | 9/2014 | Hyde et al. |
| 2014/0308930 | A1 | 10/2014 | Tran |
| 2014/0313954 | A1* | 10/2014 | Choi ............... H04W 52/0258 370/311 |
| 2015/0085059 | A1 | 3/2015 | Fisher et al. |
| 2015/0245298 | A1 | 8/2015 | Takahashi et al. |
| 2015/0245299 | A1 | 8/2015 | Lee et al. |
| 2015/0289308 | A1 | 10/2015 | Kang et al. |
| 2015/0341901 | A1 | 11/2015 | Ryu et al. |
| 2016/0029243 | A1 | 1/2016 | Seino |
| 2016/0134743 | A1* | 5/2016 | Jeon ..................... H04W 4/70 455/452.1 |
| 2016/0227446 | A1* | 8/2016 | Rodzevski ........... H04B 13/005 |
| 2016/0278067 | A1 | 9/2016 | Badam et al. |
| 2016/0323927 | A1* | 11/2016 | Yeom .................. H04W 76/15 |
| 2017/0083102 | A1 | 3/2017 | Dow et al. |
| 2017/0094595 | A1 | 3/2017 | Radhakrishnan et al. |

FOREIGN PATENT DOCUMENTS

| | | | |
|---|---|---|---|
| WO | 2015125517 | A1 | 3/2017 |
| WO | 2015155841 | A1 | 4/2017 |

OTHER PUBLICATIONS

Anand et al., "Self-Tuning Wireless Network Power Management", Wireless Networks 11, 2005, pp. 451-469.
Anand et al., "PAN-on-Demand: Leveraging multiple radios to build self-organizing, energy-efficient PANs", Proceedings of the 5th Annual International Conference on Mobile Ubiquitous Systems: Computing, Networking, and Services Article No. 24, 2008, 12 pps.
Rahmati et al., "Context-for-Wireless: Context-Sensitive Energy-Efficient Wireless Data Transfer", Proceedings of the 5th International Conference on Mobile Systems, Applications and Services, 2007, 14 pps.
Pering et al., "CoolSpots: Reducing the Power Consumption of Wireless Mobile Devices with Multiple Radio Interfaces", Proceedings of the 4th International Conference on Mobile Systems, Applications and Services, 2006, 13 pps.
Agarwal et al., "SwitchR: Reducing System Power Consumption in a Multi-Client, Multi-Radio Environment", Proceedings of the 2008 12th IEEE International Symposium on Wearable Computers, 2008, 11 pps.
Invitation to Pay Additional Fees from International Application No. PCT/US2016/064280, dated Feb. 28, 2017, 8 pp.
International Search Report and Written Opinion of International Application No. PCT/US2016/064280, dated Apr. 20, 2017, 20 pp.
Desset et al., "Energy savings for wireless terminals through smart vertical handover", 2009 IEEE International Conference on Communication, Jun. 14, 2009, 5 pp.
Response to Written Opinion dated Apr. 20, 2017, from International Application No. PCT/US2016/064280, dated Sep. 29, 2017, 13 pp.
Prosecution History of U.S. Appl. No. 14/958,902 dated Jul. 3, 2017 through Oct. 17, 2017, 22 pp.
Second Written Opinion of the IPRP dated Nov. 7, 2017, 18 pp.
Response to the Communication under Rules 161 and 162 EPC dated Dec. 10, 2018, from counterpart European Application No. 16816798.9, filed Dec. 10, 2018, 14 pp.
International Preliminary Report on Patentability from International Application No. PCT/US2016/064280, dated Feb. 12, 2018, 13 pp.
First Office Action, and translation thereof, from counterpart Japanese Application No. 2018-513875, dated Mar. 12, 2019, 15 pp.
Communication under Rule 71(3) EPC from counterpart European Application No. 16816798.9, dated Sep. 2, 2019, 7 pp.
Extended Search Report from counterpart European Application No. 19208567.8, dated Dec. 6, 2019, 7 pp.
Examination Report, and translation thereof, from counterpart Indian Application No. 201847009514, dated Feb. 29, 2020, 8 pp.

\* cited by examiner

| Wi-Fi Auto Mode | | | | |
|---|---|---|---|---|
|  | Case 1 | Case 2 | Case 3 | Case 4 |
| Wearable Device Bluetooth State | Connected to mobile device | Not Connected | Not connected | Not Connected |
| Wearing Wearable Device? | N/A | N/A | N/A | Being Worn |
| Wearable Power State | N/A | Power saver or deep ambient while not charging | Charging | Normal |
| Wi-Fi On? | Off | Off | On | On with reduced frequency of connection attempt retries |

FIG. 3

POWER SENSITIVE WIRELESS COMMUNICATION RADIO MANAGEMENT

This application is a continuation of U.S. application Ser. No. 14/958,902, filed Dec. 3, 2015, the contents of which are incorporated herein by reference.

BACKGROUND

One feature of a mobile or wearable device is the device's operational use time, i.e. the duration for which the device may be continuously used as a function of the device's stored energy (e.g. battery) capacity. Most mobile devices are designed to automatically search or poll for signals from various wireless communication networks (e.g. cellular phone, Wi-Fi, 3G, etc.) and/or to search or poll for other devices using various wireless communication technologies (e.g., Bluetooth®, Wi-Fi Direct®, etc.), regardless of what other devices the mobile device is currently connected. When sending or receiving data, mobile devices typically use such wireless communication networks or technologies. However, each different type of wireless technology uses a different amount of electrical power. Typically, mobile devices are configured to transfer data using the fastest data connection available (i.e., the data connection having the greatest available bandwidth).

SUMMARY

In some examples a method includes predicting, by a wearable device, an amount of data to be transferred from a computing device, and determining, by the wearable device, based on the amount of data, a particular wireless communication technology from a plurality of wireless communication technologies of the wearable computing device predicted to use the least amount of power for transferring the data. The method may also include determining, by the wearable device, whether the wearable device can connect to the computing device using the particular wireless communication technology, and, responsive to determining that the wearable device can connect to the computing device using the particular wireless communication technology, transferring, by the wearable device and using the particular wireless communication technology, the data.

In some example, a method includes determining, by a wearable device, whether the wearable device is connected to a computing device using a first wireless communication technology from a plurality of wireless communication technologies of the wearable device, and responsive to determining that the wearable device is not connected to the computing device using the first wireless communication technology, determining, by the wearable device, whether the wearable device is currently being worn. The method may also include, responsive to determining that the wearable device is currently being worn: determining, by the wearable device, whether the wearable device can connect to the computing device using a second wireless communication technology from the plurality of wireless communication technologies, wherein the first wireless communication technology uses less power to establish and maintain a connection with the computing device than the second wireless communication technology, and, responsive to determining that the wearable device can connect to the computing device using the second wireless communication technology, establishing, by the wearable device, a connection to the network using the second wireless communication technology.

In another example, a wearable device includes one or more processors, a plurality of communication components each associated with a respective wireless communication technology, wherein at least a first communication component from the plurality of communication components is active, and wherein at least a second communication component from the plurality of communication components is inactive, one or more motion sensors configured to detect motion of the wearable device and generate, based on the detected motion, motion data, and a storage device configured to store at least one module. The at least one module may be operable by the one or more processors to: determine whether the wearable device is connected to a computing device using the first communication component, responsive to determining that the wearable device is not connected to the computing device using the first communication technology, determine, based on the motion data, whether the wearable device is currently being worn. The module may be further operable by the one or more processors to: responsive to determining that the wearable device is currently being worn: activate the second communication component, determine whether the wearable device can connect to the computing device using the second communication component, wherein the first communication component uses less power to establish and maintain a wireless connection with the computing device than the second communication component, and, responsive to determining that the wearable device can connect to the computing device using the second communication component, establish the wireless connection to the computing device using the second communication component.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3 is a table illustrating example communication component states, in accordance with one or more techniques of this disclosure.

DETAILED DESCRIPTION

Figure 1:
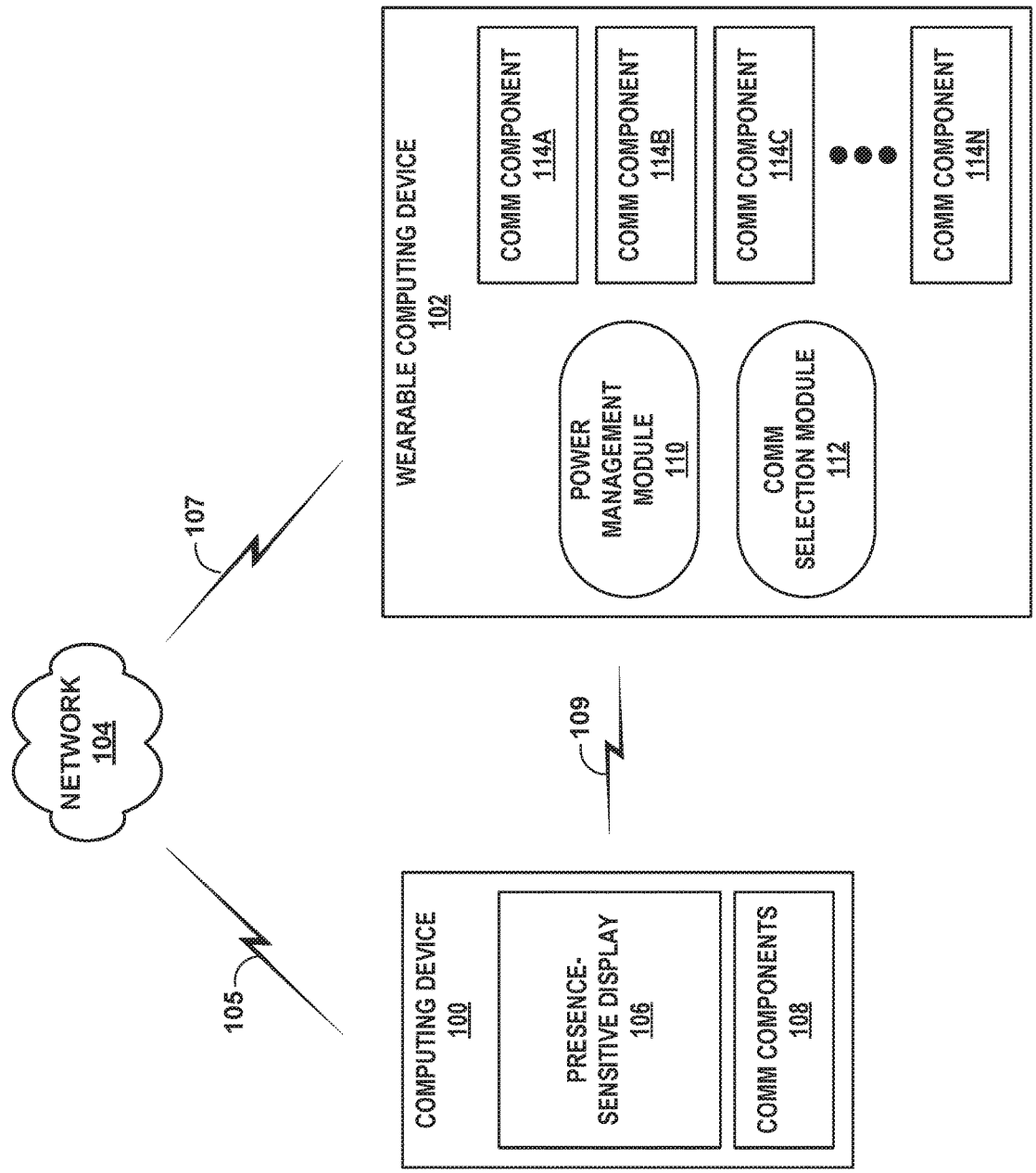
FIG. 1 is a conceptual diagram illustrating an example system that includes computing devices that intelligently manage communication components in accordance with one or more techniques of this disclosure.

In general, the disclosure is directed to techniques for power sensitive intelligent wireless communication radio management, which may reduce power consumption by a computing device (e.g., cellular phone, tablet computer, computerized watch or eyeglasses, etc.) when sending or receiving data. For instance, a computing device commonly has more than one wireless communication radio, where each radio may be capable of receiving and/or transmitting a signal (e.g. cellular, Wi-Fi, 3G, 4G, LTE, Bluetooth®, etc.). Each wireless communication radio may use a different amount of power for sending or receiving a particular amount of data. The computing device may determine how much data is likely to be transferred and may select a wireless communication radio to use for the data transfer based on the total amount of power likely to be required to complete the data transfer. That is, techniques of this disclosure may enable a computing device to minimize the amount of electrical power required to transfer data by intelligently selecting the wireless communication radio used to perform the data transfer.

In some examples, in addition to intelligently selecting the wireless communication radio, the computing device may selectively activate, deactivate, or adjust reconnection attempt parameters of one or more wireless communication radios based on a current context of the computing device. The current context may include one or more connections to other computing devices, detected movement of the computing device, computing device usage history, current location of the computing device, current charge level or state of the computing device, activity state of a user of the computing device, current time, etc. By actively managing the power state and/or reconnection policies of the wireless communication radios, the computing device may reduce the power usage of the computing device, thereby increasing the battery life of the computing device or enabling the computing device to utilize a smaller battery to achieve the same battery life.

Throughout the disclosure, examples are described wherein a computing device and/or computing system may analyze information (e.g., locations, speeds, accelerations) associated with the computing device and information (e.g., captured images, communications, calendars, files and notes) associated with the user of the computing device only if the computing device and/or the computing system receives explicit permission from the user of the computing device to analyze the information. For example, in situations discussed below in which the computing device and/or computing system may collect or may make use of information associated with the user and the computing device, the user may be provided with an opportunity to provide input to control whether programs or features of the computing device and/or computing system can collect and make use of user images and information (e.g., information about a user's e-mail, a user's social network, social actions or activities, profession, a user's preferences, or a user's past and current location), or to dictate whether and/or how the computing device and/or computing system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and/or computing system.

FIG. 1 is a conceptual diagram illustrating an example system that includes computing devices that intelligently manage communication components in accordance with one or more techniques of this disclosure. The example system of FIG. 1 includes computing device 100, wearable computing device 102, and network 104. Computing device 100 and wearable computing device 102 may be companion devices. That is, both computing device 100 and wearable computing device 102 may be associated with a single user and one device, such as wearable computing device 102, may require connectivity to the other device (e.g., computing device 100) in order to be fully functional.

In the example of FIG. 1, computing device 100 is a smartphone. However, other examples of, computing device 100 may be a cellular phone, a personal digital assistant (PDA), a laptop computer, a tablet computer, a portable gaming device, a portable media player, an e-book reader, a watch, or another type of portable or mobile device. In the example of FIG. 1, wearable computing device 102 is a wearable computing device (e.g., a computerized watch or so-called smart watch device). However, in other examples, wearable computing device 102 may be a mobile phone, a tablet computer, a personal digital assistant (PDA), a laptop computer, a portable gaming device, a portable media player, an e-book reader, a television platform, an automobile computing platform or system, a fitness tracker, or any other type of mobile or non-mobile computing device capable of intelligently managing wireless communication radios in accordance with one or more of the techniques described herein.

Network 104 represents any public or private communication network, for instance, a cellular, Wi-Fi, and/or other type of network for transmitting data between computing devices. Computing device 100 and wearable computing device 102 may send and receive data across network 100 using any suitable communication techniques. For example, computing device 100 may be operatively coupled to network 104 using network link 105 and wearable computing device 102 may be operatively coupled to network 104 by network link 107. Network 104 may include network hubs, network switches, network routers, and other network devices that are operatively inter-coupled thereby providing for the exchange of information between computing device 100 and wearable computing device 102. In some examples, network links 105 and 107 may be Ethernet, Asynchronous Transfer Mode (ATM) network, or other network connections and such connections may be wireless and/or wired connections, including cellular network connections.

Computing device 100 and wearable computing device 102 may also exchange information without traversing network 104 by, for example, using direct link 109. Direct link 109 may be any network communication protocol or mechanism capable of enabling two computing devices to communicate directly (i.e., without requiring a network switch, hub, or other intermediary network device), such as Bluetooth®, Wi-Fi Direct®, near-field communication, etc.

As shown in FIG. 1, computing device 100 is a mobile computing device. However, in other examples, computing device 110 may be a tablet computer, a personal digital assistant (PDA), a laptop computer, a portable gaming device, a portable media player, an e-book reader, a watch, a television platform, an automobile navigation system, a wearable computing device (e.g., a headset device, watch device, eyewear device, a glove device), or other type of computing device. Computing device 100 may include presence-sensitive display 106 and communication (COMM) components 108.

Presence-sensitive display 106 of computing device 100 may function as an input device for computing device 110 and as an output device. Presence-sensitive display 106 may be implemented using various technologies. For instance, presence-sensitive display 106 may function as an input device using a presence-sensitive input component, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. Presence-sensitive display 106 may function as an output (e.g., display) device using any one or more display components, such as a liquid crystal display (LCD), dot matrix display, light emitting diode (LED) display, organic light-emitting diode (OLED) display, e-ink, or similar monochrome or color display capable of outputting visible information to a user of computing device 100. Communication components 108 may include wireless communication devices capable of transmitting and/or receiving communication signals such as a cellular radio, a 3G radio, a Bluetooth® radio, or a Wi-Fi radio.

As shown in FIG. 1, wearable computing device 102 may include power management module 110, communication (COMM) selection module 112, and communication (COMM) components 114A-114N (collective, "communication components 114"). Examples of communication components 114 include wireless communication devices capable of transmitting and/or receiving communication signals such as a cellular radio, a 3G radio, a Bluetooth® radio, or a Wi-Fi radio. Modules 110 and 112 may perform operations described herein using software, hardware, or a mixture of both hardware and software residing in and executing on wearable computing device 102. Wearable computing device 102 may execute modules 110 and 112 with multiple processors. Wearable computing device 102 may execute modules 110 and 112 as a virtual machine on underlying hardware.

In a default setting, wearable computing device 102 may operate with all communication components 114 activated (e.g., turned on and consuming electrical power). In accordance with techniques of the disclosure, wearable computing device 102 may automatically deactivate and/or activate individual communication components 114, which may preserve stored electrical energy. Wearable computing device 102 may determine which of communication components 114 to activate and use based on a context of wearable computing device 102. The context may include any combination of factors, such as whether computing device 100 is reachable from wearable computing device 102 using a particular one of communication components 114, a type of data being transferred between computing device 100 and wearable computing device 102, a current time of day, an amount of charge remaining in a battery of wearable computing device 102, a predicted amount of future usage before a predicted recharge time, a monetary cost to transfer data, etc.

Wearable computing device 102 may prioritize relatively lower power communication components 114 over relatively higher power communication components 114. For example, Bluetooth® radios typically require less power to operate than Wi-Fi radios, which, in turn, typically require less power to operate than cellular radios. In such an example, communication selection module 112 may activate a Bluetooth® radio (e.g., configure communication component 114A to be active) and deactivate other communication components 114 of wearable computing device (i.e., configure the other communication components 114 to be inactive), including a Wi-Fi radio (e.g., communication component 114B) and a cellular radio (e.g., communication component 114C).

However, in examples, where wearable computing device 102 is paired to computing device 100 (e.g., configured as a companion device to computing device 100), communication selection module 112 may activate a relatively higher power communication component so as to maintain a data connection with computing device 100. For example, if wearable computing device 102 is not communicatively coupled to computing device 100 using Bluetooth® (e.g., computing device 100 is outside of the range of Bluetooth®, the Bluetooth® radio of computing device 100 is turned off, etc.), communication selection module 112 may deactivate communication component 114A and activate communication component 114B, a Wi-Fi radio, even though the Wi-Fi radio typically uses more power than a Bluetooth® radio. Similarly, if wearable computing device 102 is not communicatively coupled to computing device 100 using either Bluetooth® or Wi-Fi, communication selection module 112 may deactivate communication components 114A and 114B, and activate communication component 114C (e.g., a cellular radio) and attempt to connect to computing device 100 using cellular. While this example describes deactivating the Bluetooth® radio (e.g., communication component 114A), in other examples, communication component 114A remains active and continues to monitor for available Bluetooth® devices, including computing device 100. In such examples, if wearable computing device 102 is able to establish a Bluetooth® connection to computing device 100, communication selection module 112 may deactivate the other communication components 114 (i.e., configure the other communication components 114 to be inactive).

Power management module 110 may monitor various characteristics of wearable computing device 102 and the data being exchanged between computing device 100 and wearable computing device 102. For example, power management module 110 may monitor a current charge level of a battery or other power component of wearable computing device 102. If power management module 110 predicts that the battery will run out of power prior to a predicted time at which wearable computing device 102 will be connected to a charger, power management module 110 may cause communication selection component to prioritize power savings over connectivity to computing device 100. For example, power management module 110 may cause communication selection module 112 to disable all radios, including Bluetooth®, so as to enable wearable computing device 102 to at least display a current time until the predicted recharge time.

Power management module 110 may also configure a Wi-Fi scan rate based on an amount of charge remaining in the battery and based on the connection state of communication components 114. For example, if wearable computing device 102 is unable to establish a Bluetooth® connection to computing device 100 and if wearable computing device 102 is running off of batter power (i.e., not currently plugged in or charging), power management module 100 may configure the Wi-Fi radio (e.g., communication component 114B) to perform a Wi-Fi scan at a reduced periodic interval, such as once every three minutes as compared to if wearable computing device 102 were plugged in or charging (e.g., once every thirty seconds). As another example, if wearable computing device is connected to the Internet and/or computing device 100 via a cellular radio (e.g., communication component 114C) connection, power management module 110 may further reduce the frequency of Wi-Fi scans to, for example, once every ten minutes.

Computing device 100 and wearable computing device 102 may exchange data, such as voice data (e.g., for a telephone call), audio data (e.g., music), video data (e.g., movies), image data (e.g., still pictures), application data, sensor data, etc. In various instances, wearable computing device 102 may select a particular radio to use for data transfer based on any combination of one or more of the type of data, a predicted amount of data to be transferred, and an amount of power required to transmit a unit of data between computing device 100 and wearable computing device 102. For example, while Bluetooth® may require less power to maintain a connection to computing device 100, Bluetooth® may require more power than Wi-Fi to transmit relatively larger amount of data. That is, Bluetooth® may have a higher per megabyte power cost than Wi-Fi. Similarly, cellular may have a higher per megabyte power cost than Wi-Fi, but may have a lower per megabyte power cost than Bluetooth®. In some examples, the estimated power cost includes a predicted amount of power required to establish a connection using the particular wireless communication technology, such as the amount of power required to perform a Wi-Fi scan and connect to a Wi-Fi network, the amount of power required to search for a cellular network and connect to the cellular network, etc. In this way, wearable computing device 102 may select one of communication components 114 so as to minimize the total amount of power used to transmit data to computing device 100 or another computing device.

Techniques of this disclosure may provide one or more advantages. For example, techniques of this disclosure may enable a computing device to intelligently manage wireless communication radios in a manner that may reduce power usage, thereby increasing the battery life of the computing device and/or enabling the computing device to include a smaller battery. By determining which wireless communication technology to use for transferring data based on a total amount of power required to transfer the data, a computing device may utilize a relatively higher power radio to transfer data than typical computing devices because the relatively higher power radio may actually consume less power than a relatively lower power radio due to increase bandwidth and a lower per megabyte power cost. In this way, techniques of this disclosure may enable a computing device to meet strict power requirements while still maintaining connectivity and providing a good user experience.

Figure 2:
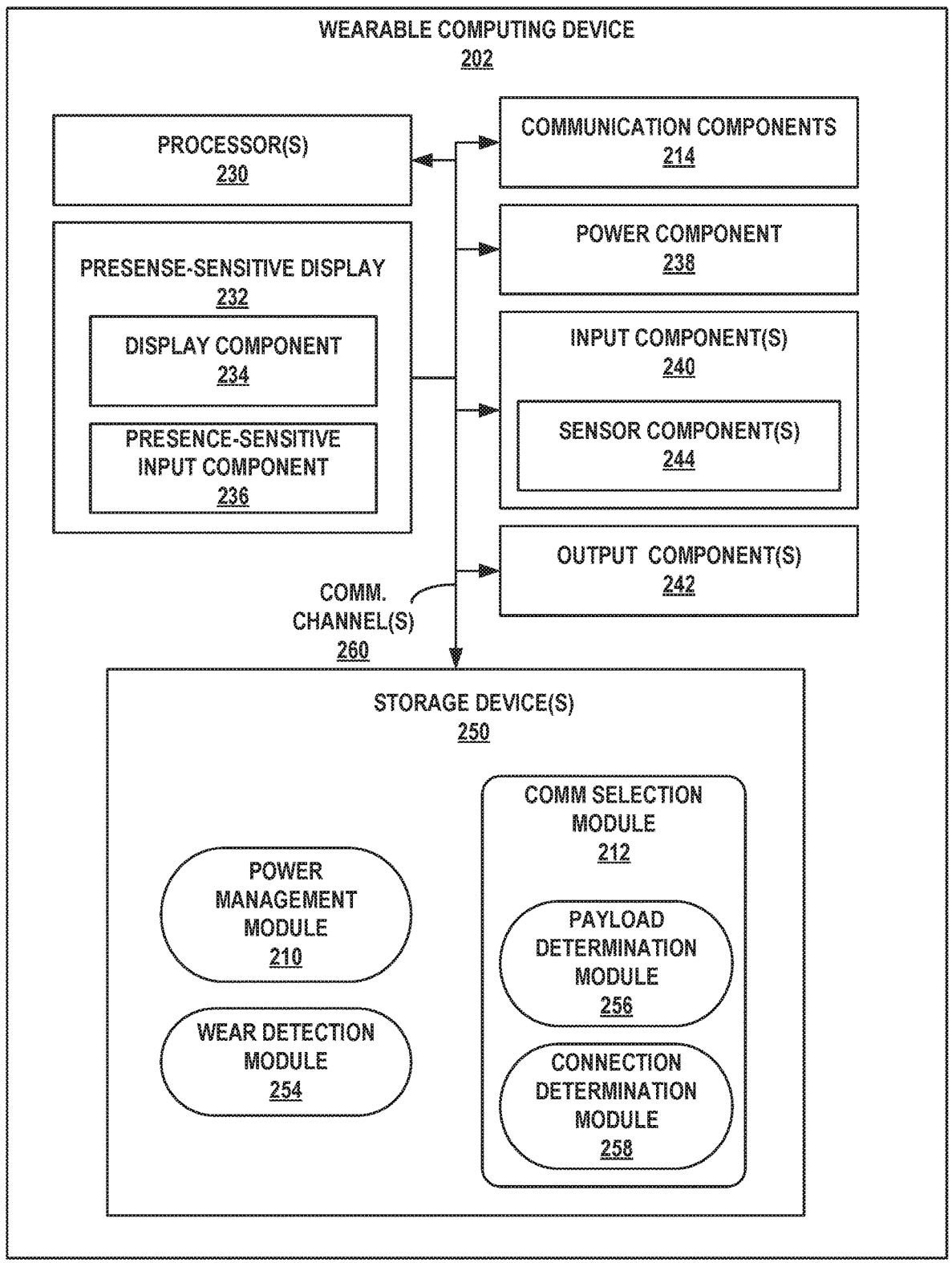
FIG. 2 is a block diagram illustrating an example configuration of a wearable device that intelligently manages communication components in accordance with one or more techniques of this disclosure.

FIG. 2 is a block diagram illustrating an example configuration of a wearable device that intelligently manages communication components in accordance with one or more techniques of this disclosure. As shown in the specific example of FIG. 2, wearable device 202 includes one or more communication components 214, one or more processors 230, a presence-sensitive display 232, a power component 238, one or more input components 240, one or more output components 242, one or more sensor components 244, and one or more storage devices 250. Communication channels 260 may interconnect each of the components 214, 230, 232, 238, 240, 242, 244, and 250 for inter-component communications (physically, communicatively, and/or operatively). In some examples, communication channels 260 may include a system bus, a network connection, an inter-process communication data structure, or any other method for communicating data. Communication components 214, power management module 210, and communication selection module 212 of FIG. 2 may provide similar capability and functionality to wearable device 202 as communication components 114, power management module 110, and communication selection module 112 of FIG. 1.

As shown in FIG. 2, wearable device 202 may include power component 238. In some examples, power component 238 may be a battery. Power component 238 may store electric power and provide electric power to one or more components of wearable device 202. Examples of power component 238 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power component 238 may have a limited capacity (e.g., 100-3000 mAh).

One or more storage devices 250 within computing device 100 may store information required for use during operation of wearable device 202. Storage device 250, in some examples, has the primary purpose of being a short term and not a long term computer-readable storage medium. Storage device 250 on wearable device 202 may be a volatile memory and therefore not retain stored contents if powered off. Examples of volatile memories include random access memories (RAM), dynamic random access memories (DRAM), static random access memories (SRAM), and other forms of volatile memories known in the art. Storage device 250 may further be configured for long-term storage of information as non-volatile memory space and retain information after power on/off cycles. Examples of non-volatile memory configurations include magnetic hard discs, optical discs, floppy discs, flash memories, or forms of electrically programmable memories (EPROM) or electrically erasable and programmable (EEPROM) memories. In some examples, processors 230 on wearable device 202 read and execute instructions stored by storage device 250. In the example of FIG. 2, storage device 250 of wearable device 202 includes power management module 210, communication (COMM) selection module 212, signal detect module 252, and wear detection module 254. In addition, modules 210, 212, 252, and 254 may store information within storage device 250 during program execution.

One or more processors 230 may implement functionality and/or execute instructions within wearable device 202. For example, processors 230 may process instructions stored in storage device 250 that execute the functionality of modules 210, 212, 252, and 254.

Presence-sensitive display 232 of wearable device 202 includes display component 234 and presence-sensitive input component 236. Display component 234 may be a screen at which information is displayed by presence-sensitive display 232 and presence-sensitive input component 236 may detect an object at and/or near display component 234. As one example range, presence-sensitive input component 234 may detect an object, such as a finger or stylus that is within two inches or less of display component 234. Presence-sensitive input component 235 may determine a location (e.g., an [x, y] coordinate) of display component 234 at which the object was detected. In another example range, presence-sensitive input component 235 may detect an object six inches or less from display component 234 and other ranges are also possible. Presence-sensitive input component 236 may determine the location of display component 234 selected by a user's finger using capacitive, inductive, and/or optical recognition techniques. In some examples, presence-sensitive input component 236 also provides output to a user using tactile, audio, or video stimuli as described with respect to display component 234. In the example of FIG. 2, presence-sensitive display 232 may present a user interface.

While illustrated as an internal component of wearable device 202, presence-sensitive display 232 may also represent and an external component that shares a data path with wearable device 202 for transmitting and/or receiving input and output. For instance, in one example, presence-sensitive display 232 represents a built-in component of wearable device 202 located within and physically connected to the external packaging of wearable device 202 (e.g., a screen on a mobile phone). In another example, presence-sensitive display 232 represents an external component of wearable device 202 located outside and physically separated from the packaging or housing of wearable device 202 (e.g., a monitor, a projector, etc. that shares a wired and/or wireless data path with wearable device 202).

Presence-sensitive display 232 of wearable device 202 may receive tactile input from a user of wearable device 202. Presence-sensitive display 232 may receive indications of the tactile input by detecting one or more tap or non-tap gestures from a user of wearable device 202 (e.g., the user touching or pointing to one or more locations of presence-sensitive display 232 with a finger or a stylus pen). Presence-sensitive display 232 may present output to a user. Presence-sensitive display 232 may present the output as a graphical user interface, which may be associated with functionality provided by various functionality of wearable device 202. For example, presence-sensitive display 232 may present various user interfaces of components of a computing platform, operating system, applications, or services executing at or accessible by wearable device 202 (e.g., an electronic message application, a navigation application, an Internet browser application, a mobile operating system, etc.). A user may interact with a respective user interface to cause wearable device 202 to perform operations relating to one or more the various functions.

Presence-sensitive display 232 of wearable device 202 may detect two-dimensional and/or three-dimensional gestures as input from a user of wearable device 202. For instance, a sensor of presence-sensitive display 232 may detect a user's movement (e.g., moving a hand, an arm, a pen, a stylus, etc.) within a threshold distance of the sensor of presence-sensitive display 232. Presence-sensitive display 232 may determine a two or three dimensional vector representation of the movement and correlate the vector representation to a gesture input (e.g., a hand-wave, a pinch, a clap, a pen stroke, etc.) that has multiple dimensions. In other words, presence-sensitive display 232 can detect a multi-dimension gesture without requiring the user to gesture at or near a screen or surface at which presence-sensitive display 232 outputs information for display. Instead, presence-sensitive display 232 can detect a multi-dimensional gesture performed at or near a sensor which may or may not be located near the screen or surface at which presence-sensitive display 232 outputs information for display.

Wearable device 202 may include one or more input components 240 that wearable device 202 uses to receive input. Examples of input are tactile, audio, image and video input. Input components 240 of wearable device 202, in one example, includes a presence-sensitive display, touch-sensitive screen, voice responsive system, a microphone or any other type of device for detecting input from a human or machine. In some examples, input components 240 include one or more sensor components 244. Numerous examples of sensor components 244 exist and include any input component configured to obtain environmental information about the circumstances surrounding wearable device 202 and/or physiological information that defines the activity state and/or physical well-being of a user of wearable device 202. For example, sensor components 244 may include movement sensors (e.g., accelerometers), temperature sensors, position sensors (e.g., a gyro), pressure sensors (e.g., a barometer), proximity sensors (e.g., an inferred sensor), ambient light detectors, heart-rate monitors, location sensors (GPS components, Wi-Fi components, cellular components), and any other type of sensing component (e.g., microphone, a still camera, a video camera, a body camera, eyewear, or other camera device that is operatively coupled to wearable device 202, infrared proximity sensor, hygrometer, and the like). Wearable device 202 may use sensor components 244 to obtain contextual information associated with wearable device 202 and a user. In some examples, one or more of power management module 210, communication selection module 212 and wear detection module 254 may rely on the sensor information obtained by sensor components 244.

Wearable device 202 may include one or more output devices 230 that wearable device 202 uses to provide output. Examples of output are tactile, audio, still image and video output. Output components 230 of wearable device 202, in one example, includes a presence-sensitive display, sound card, video graphics adapter, speaker, liquid crystal display (LCD), or any other type of device for generating output to a human or machine.

In accordance with the techniques of this disclosure, communication selection module 212 may select one or more communication components 214 to utilize for connection to another computing device (e.g., computing device 100 of FIG. 1) and/or for sending or receiving data (e.g., over the Internet, to the other computing device, etc.) in a manner so as to attempt to minimize total power consumption. As shown in FIG. 2, communication selection module 212 includes payload determination module 256 and connection determination module 258.

In instances where wearable device 202 is attempting to establish a connection with another computing device (e.g., computing device 100 of FIG. 1), communication selection module 212 may use a relatively low power one of communication components 214 (e.g., a Bluetooth® radio) and attempt to connect to computing device 100 using a direct wireless connection (e.g., wireless link 109 of FIG. 1). That is, communication selection module 212 may be configured to initially attempt to establish a connection with computing device 100 using a lowest powered one of communication components 214. When attempting to establish a connection with computing device 100, the Bluetooth® radio may be in a "listen" mode where the Bluetooth® radio detects if any other Bluetooth® devices are reachable.

Connection determination module 258 may determine if the Bluetooth® radio detects computing device 100 and, if so, causes wearable device 202 to establish a Bluetooth® connection to computing device 100. If connection determination module 258 determines that computing device 100 is not reachable via Bluetooth®, communication selection module 212 may activate another one of communication components 214 for establishing the connection with computing device 100. For example, wearable device 202 may be preconfigured to attempt to connect to network 104 of FIG. 1 using a Wi-Fi radio and, if unable to connect using the Wi-Fi radio, connect to network 104 using a cellular radio. That is, wearable device 202 may be preconfigured to initiate a wireless connection to computing device 100 and/or the Internet using the wireless communication radio that requires the least amount of power to establishing and/or maintain such a connection.

In attempting to establish a network connection with the Wi-Fi radio, communication selection module 212 may cause the Wi-Fi radio to perform a network scan. The one of communication components 214 that corresponds to the Wi-Fi radio scans to determine which, if any, Wi-Fi networks are available. Connection determination module 258 may analyze the list of available Wi-Fi networks and determine if any are "known" Wi-Fi networks, i.e., whether the service set identifier ("SSID") of any of the available Wi-Fi networks corresponds to Wi-Fi network configuration information stored at wearable device 202 such that wearable device 202 may establish a connection to the Wi-Fi network. If one of the available Wi-Fi networks is a known Wi-Fi network, connection determination module 258 attempts to establish a connection to the known Wi-Fi network.

If none of the available Wi-Fi networks is a known Wi-Fi network or if connection determination module 258 is unable to establish a connection with a known Wi-Fi network, communication selection module 212 may place the Wi-Fi radio in a low power or "sleep" mode for an amount of time and attempt to establish a network connection using another one of communication components 214. Communication selection module 212 may be configured to select the other one of communication components 214 based on an estimated amount of power required to establish and maintain a network connection using the particular wireless communication technology. For example, communication selection module 212 may be preconfigured to next attempt to establish a network connection using one of communication components 214 that corresponds to a cellular radio because the cellular radio requires more power to establish and maintain a network connection than Bluetooth® or Wi-Fi, but less power than another wireless communication technology. In examples where wearable device 202 establishes a cellular network connection (e.g., to computing device 100 of FIG. 1), communication selection module 212 may leave the Bluetooth® radio powered on and configured to "listen" for other Bluetooth devices.

The Wi-Fi radio may be placed in the low power state for an amount of time determined based on user preferences and/or the connection state of one or more of communication components 214 in an attempt to provide a good user experience while minimizing the amount of power used. For example, power management module 210 may place the Wi-Fi radio in the low power state for two minutes, three minutes, five minutes, or ten minutes. The duration of the low power state may be based, in part, on the connection state of one or more other communication components 214. For example, if wearable device 202 is connected to a network using a cellular radio, power management module 210 may increase the duration of the low power mode so as to reduce the number of Wi-Fi reconnection attempts (which may be power expensive) because the user experience is sufficient when connected via cellular that power management module 210 prioritizes power savings over quickly establishing a Wi-Fi network connection. After the amount of time elapses, communication selection module 212 may activate the Wi-Fi radio and again attempt to establish a Wi-Fi network connection. In this way, communication selection module 212 may dynamically adjust the Wi-Fi scan rate based on the network connection status of other communication components 214 of wearable device 202 in addition to the connection status of the Wi-Fi radio.

Power management module 210 may also adjust the Wi-Fi scan rate based on the power and/or connection state of other components of wearable device 202, including one or more sensors 244. For example, as it is power expensive to perform a Wi-Fi scan, power component 238 and/or one or more of communication components 214 may increase in temperature. However, certain ones of sensors components 244 or communication components 214 may be thermally sensitive such that they may not perform as well outside of a preferred thermal range. In particular, antennas associated with various communication components 214 and/or sensor components 244 may have decreased performance outside of the preferred thermal range. As such, power management module 210 may monitor power states of various components of wearable device 202 and/or a current temperature of one or more antennas of wearable device 202. Based on the power state and/or temperature, power management module 210 may adjust the Wi-Fi scan rate in an attempt to keep the current temperature of wearable device 202 within the preferred thermal range while the particular communication components 214 and sensor components 244 are powered on. For example, power management module 210 may increase the duration of the low power mode (i.e., increase the time between Wi-Fi scans), which may reduce the temperature of wearable device 202, which, in turn, may maintain the performance of the antennas associated with the particular communication components 214 and sensor components 244.

In some examples, power management module 210 adjusts the Wi-Fi scan rate based on whether wearable device 202 is currently connected to a charger. For example, power management module 210 may determine that power component 238 is currently charging and, in response, prioritize connectivity over power and/or thermal concerns. That is, power management module 210 may increase the Wi-Fi scan rate (i.e., decrease the duration of the low power mode), establish a cellular connection, etc. In this way, in instances where wearable device 202 is a companion device to computing device 100, wearable device 202 prioritizes connectivity to the companion device over power concerns such that wearable device 202 is synchronized with the companion device when wearable device 202 is removed from the charger.

However, while wearable computing device is charging, power component 238 may heat up, which may increase the temperature of wearable device 202 and reduce the performance of various antennas of wearable device 202. In order to mitigate the thermal issues, power management module 210 may monitor a current temperature of various components of wearable device 202 and adjust the charging rate of power component 238. By reducing the charging rate of power component 238, power management module 210 may reduce the temperature of wearable device 202, which may maintain the desired performance of the antennas of wearable device 202.

Communication selection module 212 may also power on/off various communication components 214 based on movement of wearable device 202 and/or whether wearable device 202 is currently "donned" by a user (i.e., is currently being worn by the user or is on the body of the user). Wear detection module 254 may analyze sensors data from one or more sensor components 244 to determine whether wearable device 202 is currently being worn and an amount of time that has elapsed since wearable device 202 last moved. In examples where sensor components 244 includes one or more of a heart rate monitor, a galvanic skin response senor, or other sensor that can detect whether wearable computing device is in contact with a user's skin, wear detection module 254 may analyze the sensor information to determine if wearable device 202 is currently being worn. For example, if the heart rate monitor provides heart rate information to wear detection module 254, wear detection module 254 can determine if the heart rate information is valid heart rate information (e.g., indicates a heart rate greater than zero beats per minute, less than 250 beats per minute, etc.) and, in response to determining that the hear rate information is valid, determine that wearable device 202 is currently being worn. As another example, wear detection module 254 may analyze data from the galvanic skin response sensor to determine if a user is currently wearing wearable device 202 (e.g., based on a current conductance detected by the galvanic skin response sensor).

Wear detection module 254 may also determine whether wearable device 202 is currently being worn using motion and/or position sensors (e.g., accelerometer, gyroscopes, etc. of sensor components 244). For example, wear detection module 254 may monitor movement patterns detected by sensor components 244 and determine whether the movement patterns correspond to known movements (e.g., of a limb) of a user. If the movement patterns correspond to known movements, wear detection module 254 may determine that wearable computing device is currently being worn. However, in various instances, wear detection module 254 may determine that wearable device 202 is currently being worn even if the movement patterns do not correspond to known movements. Instead, wear detection module 254 may determine that any motion of wearable device 202 indicates that wearable device 202 is currently being worn. Similarly, wear detection module 254 determine that wearable device 202 is not currently being worn if wearable device 202 has not moved for a threshold amount of time (e.g., one minute, three minutes, five minutes, etc.).

Responsive to determining that wearable device 202 is not being worn, power management module 210 may power off one or more communication components 214, place one or more communication components 214 into a low power or reduced power mode, and/or adjust the frequency at which one or more communication components 214 attempt to establish a network connection. For example, power management module 210 may power off any Wi-Fi and cellular radios while leaving a Bluetooth® radio powered on.

Determining whether or not wearable computing device 202 is being worn requires a non-zero amount of power, which may offset any power savings achieved by adjusting the power states and/or operating characteristics of communication components 214. As such, wear detection module 254 may adjust how often wear detection module 254 performs off-body detection based on a likelihood that the user has removed wearable device 202 (e.g., based on historical user behavior, time of day, etc.) and a power cost to maintain the current operating characteristics of communication components 214. Historical user behavior may include previous usage information (e.g., how a user directly interacts with wearable device 202), notification history (e.g., time and frequency of received notifications), etc.

For example, if wear detection module 254 determines, based on prior user behavior, that a user is likely to have removed wearable device 202, wear detection module 254 may perform the off-body detection techniques to determine if the user has actually removed wearable device 202. However, if wear detection module 254 determines, based on prior user behavior, that the user is likely to put wearable device 202 back on within a relatively short period of time (e.g., five minutes), wear detection module 254 may determine that the amount of power required to perform the off-body detection may be greater than or equal to the amount of power required to power the radios until the user is likely to don wearable device 202. In response, wear detection module 254 may not to perform off-body detection and, instead, maintain the current power state of communication components 214.

Wearable computing device 202 may be configured to ensure a minimal amount of functionality until the next time at which wearable device 202 is predicted be connected to a charger unless a user overrides or otherwise causes wearable device 202 to run out of power prior to the next time wearable device 202 is charged. Power management module 210 may monitor the user's activity and the amount of power utilized by one or more communication components 214 during the discharge cycle and use this information to predict an amount of time remaining before power component 238 runs out of power. That is, power management module 201 may keep track of how many minutes each of communication components 214 were active during the discharge cycle and how much power each of communication components 214 used while active and power on/off various communication components 214 to predict how many minutes of battery life remain.

Power management module 210 may determine the estimated amount of operating time remaining based on the current charge level of power component 238, a historical power usage of wearable device 202, and/or a predicted future power usage of wearable device 202. The historical power usage may include the average power usage since wearable device 202 was last disconnected from a charger, an average power usage for the particular context (e.g., day of the week, location, scheduled calendar events, temperature, current activity, time, average amount of data sent/received, etc.), an average power usage for a particular amount of time (e.g., average daily power usage over the previous thirty days), etc. The predicted future power usage may be based on the average power usage for the particular context and/or predicted future context of wearable device 202. In some examples, power management module 210 may determine an amount of time each of communication components 214 are active during the current discharge cycle. Based on the amount of active time of each communication component 214, power management module 210 may estimate how much power each communication component 214 has used during the discharge cycle.

If power management module 210 predicts that power component 238 will run out of power prior to the next predicted charging time, communication selection module 212 may adjust the operating characteristics of communication components 214. For example, based on the amount of active time of each communication component 214, power management module 210 may disable relatively higher power communication components 214 in an attempt to reduce the rate of power drain and maintain at least partial functionality of wearable device 202 until wearable device 202 is predicted to be connected to a charger. As other examples, power management module 210 may reduce the power usage rate by reducing the Wi-Fi scan rate, disabling all communication components 214, disabling various sensor components 244, disabling presence-sensitive input component 236, etc.

In some instances, power management module 210 may determine a current amount of power being used by one or more communication components 214. For example, power management module 210 may monitor the power consumption (e.g., the number of milliamp hours) currently being consumed by each communication component 214. If power management module 210 determines that one communication component 214 (e.g., a Wi-Fi radio) is consuming more power than expected, power management module 210 may notify communication selection module 212 and cause communication selection module 212 to select a different one of communication components 214 for the network connection.

Communication selection module 212 may select which one of communication components 214 to use to transfer data based on characteristics of the data that is going to be sent from and/or received by wearable device 202. Each communication component 214 may use a different amount of power for sending or receiving a particular amount of data. Communication selection module 212 may determine how much data is likely to be transferred and may select one of communication components 214 to use for the data transfer based on the total amount of power likely to be required to complete the data transfer. Payload determination module 256 of communication selection module 212 may predict an amount of data to be transferred based on a type of data (e.g., audio, video, text, etc.), an application associated with the data transfer (e.g., a video player application, a web browser, etc.), a priority assigned to the data being transferred (e.g., by a developer), an amount of bandwidth requested by the application associated with the data transfer, a length of a data queue, etc.

As one example, payload determination module 256 may determine that the file type of the data being transferred corresponds to video data. IN such an example, payload determination module 256 may be configured to determine that, when transferring video data, a large amount of data is typically transferred to wearable device 202. In response to determining that a relatively large amount of data is predicted to be transferred, communication selection module 212 may prioritize a network connection using a relatively higher power wireless radio but that has a relatively large amount of bandwidth (e.g., a Wi-Fi radio) over a network connection using a relatively low power wireless radio but that has a relatively small amount of bandwidth (e.g., a Bluetooth® radio). In such an example, communication selection module 212 may determine that it is more power efficient to use the Wi-Fi radio to transfer the data than it is to use the Bluetooth® radio to transfer the data. In instances where wearable device 202 is a companion device to computing device 100, wearable device 202 may establish a direct Wi-Fi connection with computing device 100 (i.e., a Wi-Fi connection that does not include an intermediary network element, such as a wireless router).

As another example, payload determination module 256 may determine that the data to be transferred is audio data associated with an incoming phone call. As voice audio data for a phone call is relatively low bandwidth, communication selection module 212 may power off a Wi-Fi radio and, instead, establish a Bluetooth connection with a device sending the audio data (e.g., to computing device 100). In another example, the data being transferred may include a flag or other indication of whether the data requires high-bandwidth connectivity. For example, computing device 100 is transferring music to wearable device 202, a music application executing on computing device 100 may send, to wearable device 202, initial data that includes a flag indicating that the data to be transferred is music data and/or requires high bandwidth connectivity. In response to receiving the indication of the higher bandwidth requirement, communication selection module 212 may activate the Wi-Fi radio and initiate a Wi-Fi scan in attempt to connect to computing device 100 over Wi-Fi rather than Bluetooth®. In this way, communication selection module 212 may dynamically select one or more communication components 214 to use for transferring data based on characteristics of the data being transferred and may reduce the amount of power used to transfer the data.

FIG. 3 is a table 300 illustrating example communication component states, in accordance with one or more techniques of this disclosure. For purposes of illustration, wireless communication state table 300 is described below with respect to computing device 100 and wearable computing device 102 of FIG. 1, although other devices may be configured consistent with table 300.

Table 300 illustrates example Wi-Fi radio power states based on whether wearable computing device 102 is connected to computing device 100 using Bluetooth, whether wearable computing device 102 is currently being worn by a user, and a power state of wearable computing device 102. In particular, table 300 illustrates four distinct connection states. In state one, wearable computing device 102 is connected to computing device 100 using Bluetooth®. In this state, wearable computing device 102 may be configured to use Bluetooth® to transfer data and to disable the Wi-Fi radio regardless of whether wearable computing device 102 is being worn and regardless of the power state of wearable computing device 102.

In the second state, wearable computing device 102 is not connected to computing device 100 via Bluetooth®, but is in a power saving mode (e.g., to ensure that wearable computing device 102 may provide a minimal amount of functionality until wearable computing device 102 is next connected to a charger). Because wearable computing device 102 is not connected via Bluetooth®, but is in the power saving mode, wearable computing device powers off the Wi-Fi radio, regardless of whether wearable computing device 102 is currently being worn. In some examples, wearable computing device 102 does not perform off-body detection which in the power saving mode.

State three is illustrated in FIG. 3 such that wearable computing device 102 is not connected to computing device 100 via Bluetooth®, but is currently charging (i.e., is currently connected to a charger). In state three, wearable computing device is configured to turn on the Wi-Fi radio regardless of whether a user is currently wearing wearable computing device 102. By turning on Wi-Fi, wearable computing device 102 may be more frequently synchronized with computing device 100 without reducing the battery life of wearable computing device 102.

In the fourth state, wearable computing device 102 is not connected to computing device 100 using Bluetooth®, is in a "normal" power mode (i.e., is not currently charging and is not in a power saving mode), and is currently being worn by a user. In this state, wearable computing device 102 may be turned on, but may perform Wi-Fi scans at a reduced frequency as compared to when wearable computing device 102 is connected to a charger, which may reduce power usage and increase the amount of time a user may use wearable computing device 102 before charging wearable computing device 102.

Figure 4:
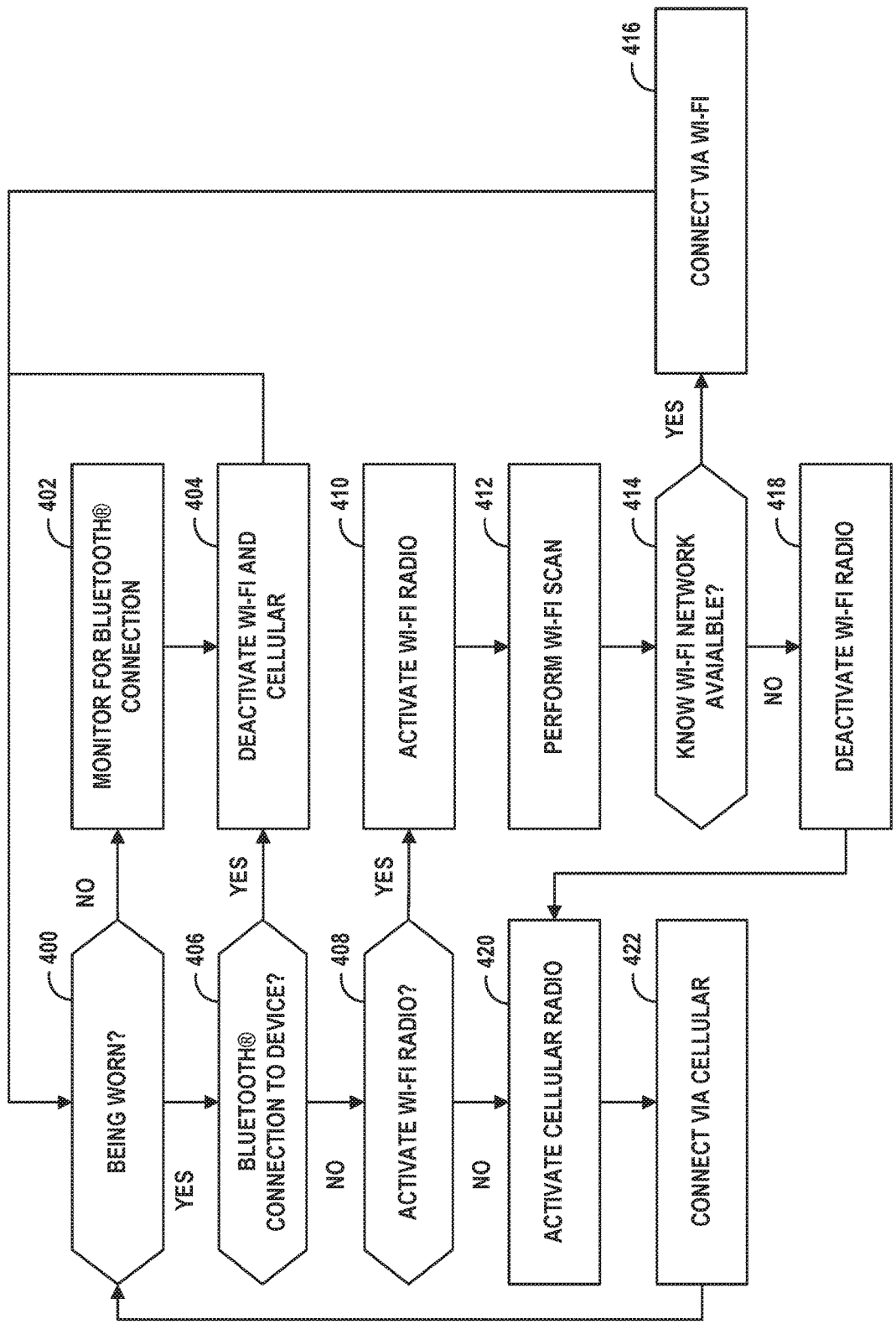
FIGS. 4 and 5 are flowcharts illustrating example operations of a wearable device, in accordance with one or more techniques of this disclosure.

FIG. 4 is a flowchart illustrating an example operation of a computing device, in accordance with one or more techniques of this disclosure. The example operation shown in FIG. 4 is described below with respect to computing device 100 of FIG. 1 and wearable device 202 of FIG. 2, although other computing devices may perform the operations of FIG. 4.

In the example of FIG. 4, wearable device 202 may determine if a user is wearing wearable device 202 (400). For example, wear detection module 254 wearable device 202 may analyze motion data generated by an accelerometer, gyroscope, or other motion sensor of wearable device 202 to determine if wearable device 202 is being worn. For example, if the motion patterns correspond to know user movements, wear detection module 254 may determine that a user is currently wearing wearable device 202 ("YES" branch of 400). As another example, if the motion data indicates that wearable device 202 has been stationary for a threshold amount of time (e.g., 60 seconds, 5 minutes, 20 minutes, etc.), wear detection module 254 may determine that the user is not currently wearing wearable device 202 ("NO" branch of 400).

In instances where wear detection module 254 determines that wearable device 202 is not being worn ("NO" branch of 400), communication selection module 212 may ensure that a Bluetooth® radio (e.g., one of communication components 214) is turned on/enabled and monitor for a Bluetooth® connection to a companion device, such as computing device 100 of FIG. 1 (402). Further power management module 210 may turn off any Wi-Fi and cellular radios (404), which may reduce power consumption while wearable device 202 is not being worn.

In instances where wear detection module 254 determines that wearable device 202 is being worn ("YES" branch of 400), connection determination module 258 of communication selection module 212 may determine whether wearable device 202 is connected to a companion device (e.g., computing device 100 of FIG. 1) via Bluetooth® (406). If connection determination module 258 determines that wearable device 202 is connected to the companion device ("YES" branch of 406), power management module 210 powers off the Wi-Fi and cellular radios (404), which may save energy while wearable device 202 is connected to the companion device. Wearable device 202 may exchange data using the Bluetooth® connection with the companion device, including sending and receiving data to devices on the Internet, such that the Wi-Fi and cellular connections are not needed.

If connection determination module 258 determines that wearable device 202 is not connected to a companion device using Bluetooth® ("NO" branch of 406), communication selection module 212 determines if a Wi-Fi radio (e.g., one of communication components 214) should be woken up from a sleep state (i.e., activated, powered on, etc.) (408). In some examples, power management module 210 manages the wake-sleep cycle of the Wi-Fi radio so as to reduce power usage. For example, if connection determination module 258 determines that there is no known Wi-Fi network available, power management module 210 may cause the Wi-Fi radio to go into a "sleep" (i.e., low power or powered off) mode for a predetermined amount of time (e.g., 1 minute, 3 minutes, 5 minutes, etc.). As another example, if power management module 210 determines that the amount of power remaining in power component 238 is insufficient to power wearable device 202, at the current discharge rate, until the predicted next time wearable device 202 is going to be connected to a charger, power management module 210 may disable the Wi-Fi radio, as well as other components, such as the cellular radio, until wearable device 202 is connected to the charger or until power management module 210 predicts that there is sufficient power remaining in power component 238 to keep wearable device 202 operating until wearable device 202 is predicted to be connected to a charger. In such examples, communication selection module 212 determines that the Wi-Fi radio should not be woken from the sleep state (i.e., should not transition to a higher power mode from a lower power mode) and should not initiate a Wi-Fi scan to detect available Wi-Fi networks ("NO" branch of 408).

If communication selection module 212 determines that the Wi-Fi radio should not be woken up from the sleep state ("NO" branch of 408), communication selection module 212 may activate a cellular radio of wearable device 202 (420) and attempt to establish a cellular Internet connection to a companion device (422). That is, if wearable device 202 is unable to connect to the companion device using Bluetooth® or Wi-Fi, communication selection module 212 may attempt to connection to the companion device using a relatively higher power communication technology, such as cellular. However, even if a network connection to the companion device is established using the cellular radio (e.g., via network 104), wearable device 202 continues to determine if it is being worn (400) and continues to attempt to connect to the companion device using a relatively lower power radio (402-418).

If communication selection module 212 determines that the Wi-Fi- radio should be woken up from the sleep state ("YES" branch of 408), power management module 210 activates the Wi-Fi radio (410) and connection determination module 258 causes the Wi-Fi radio to perform a Wi-Fi scan (412). In performing the Wi-Fi scan, the Wi-Fi radio detects available Wi-Fi networks at the current location of wearable device 202. Connection determination module 258 determines if any of the available Wi-Fi networks are "known" Wi-Fi networks or if wearable device 202 is otherwise able to connect to one of the available Wi-Fi networks (414). Known Wi-Fi networks may include a direct Wi-Fi connection to the companion device (i.e., a connection to computing device 100 that does not traverse network 104). If connection determination module 258 determines that one of the Wi-Fi networks is a "known" Wi-Fi network ("YES" branch of 414), connection determination module 258 attempts to connect to the Wi-Fi network (416). In instances where wearable device 202 is able to establish the connection to the Wi-Fi network and to the companion device, wearable device 202 may be configured to continue to determine if it is currently being worn (400) and may continue to attempt to connect to the companion device using a relatively lower power wireless radio technology, such a Bluetooth® (420-404). In some examples, even though wearable device 202 is able to connect to a Wi-Fi network, wearable device 202 may not be able to establish a connection with the companion device using the Wi-Fi network. In such examples, connection determination module 258 may operate as if wearable device 202 was unable to connect to any available Wi-Fi network.

In examples where connection determination module 258 is unable to connect via Wi-Fi because there are no known Wi-Fi networks or for other reasons ("NO" branch of 414), power management module 210 puts the Wi-Fi radio into a sleep state (418) for a preconfigured period of time, enables the cellular radio (420), and attempts to connect to the Internet using the cellular radio (422). The preconfigured period of time may be dynamically adjusted based on a current amount of power remaining in power component 238, whether wearable device 202 is connected to a charger, a power usage rate of wearable device 202, a type of data being or to be transferred, among other factors. In this way, wearable device 202 may intelligently select which wireless communication technology to use to connect to a companion device (e.g., computing device 100 of FIG. 1), which may reduce the amount of power used by wearable device 202.

Figure 5:
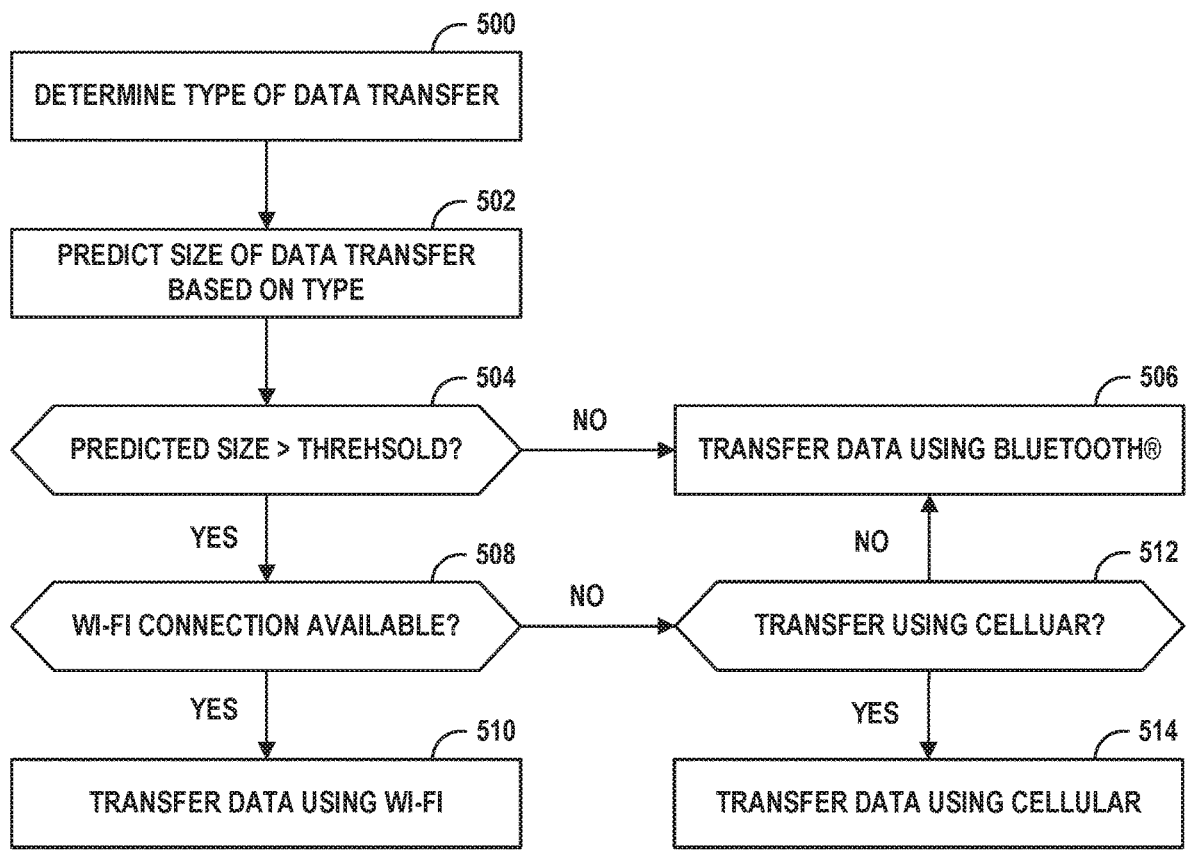

FIG. 5 is a flowchart illustrating an example operation of a computing device, in accordance with one or more techniques of this disclosure. The example operation shown in FIG. 5 is described below with respect to computing device 100 of FIG. 1 and wearable device 202 of FIG. 2, although other computing devices may perform the operations of FIG. 4. Further, the example operation of FIG. 5 may be combined with the example operation of FIG. 4 such that wearable device 202 may determine which wireless communication technology to use not only based on how much power is required for each wireless radio to establish and maintain a connection to the companion device and/or the Internet, but also based on a predicted amount of power required to exchange data with the companion device or another device available via the Internet. In the example operation illustrated in FIG. 5, it is assumed that wearable device 202 is connected to computing device 100 using Bluetooth® and than wearable device 202 and computing device 100 are transferring data between each other.

In determining which wireless communication technology to use for transferring data, payload determination module 256 of wearable device 202 may determine what type of data is going to be transferred (500). For example, if a user launches a music application at wearable device 202, payload determination module 256 may determine that the user is likely to transfer audio data. As another example, if a user launches a streaming video viewing application, payload determination module 256 may determine that the user is likely to transfer video data. In yet another example, payload determination module 256 may determine the type of data to be transferred based on a file extension (e.g., ".mp4", ".avi", ".jpg", ".txt", ".zip", etc.). In some instances, payload determination module 256 may analyze an initial portion of data (e.g., a first one, ten, fifty, etc. data packets) and determine, based on the contents of the initial portion of data (e.g., packet header information, data stored in the payload portion of the packet, etc.), the type of data being transferred.

Payload determination module 256 may predict, based on the type of the data being transferred, a size (i.e., amount) of data that is going to be transferred (502) and determine if the amount of data is greater than a threshold amount (504). Various wireless communication technologies utilize different amounts of power for transferring the same amount of data. For example, Bluetooth® may require a relatively small amount of power to maintain a connection, but a relatively large amount of power to transmit data whereas Wi-Fi may require a relatively large amount amount of power to establish and maintain a connection, but only use a relatively small amount of power to transmit data. That is, each different wireless connection technology may use a different amount of power to transmit a megabyte of data such that a wireless communication technology that may be considered to typically use a relatively large amount of power may actually be more power efficient when transferring relatively large amounts of data than a different wireless communication technology that may be considered to typically use a relatively small amount of power.

Further, communication selection module 212 may determine which wireless communication technology to use to transfer the data based on factors other than power requirements, such as a monetary cost to transfer the data using each wireless communication technology. For example, transferring data using a cellular connection may be monetarily more expensive than transferring data using Wi-Fi such that, even though transferring the data using the cellular connection may require less power, communication selection module 212 determines that the data should be transferred using Wi-Fi because the monetary cost of the cellular connection outweighs the power savings. As another example, even though Wi-Fi may typically require less power to transfer the data, communication selection module 212 may determine that there is a limited amount of bandwidth available Wi-Fi network such that transferring the data may take longer than initially predicted, which may result in using more power than a different wireless connection technology. In such examples, communication selection module 212 may switch to a different wireless connection technology for transferring the data. In general, communication selection module 212 may apply a weighting to the various factors when determining which wireless communication technology to use for transferring the data.

The threshold amount of data may be different for each different type of wireless communication technology and may be different when comparing different wireless technologies. For example, if wearable device 202 is able to connection to computing device 100 using Bluetooth® and Wi-Fi, communication selection module 202 may configure the threshold such that data transfers of less than one megabyte should be transferred using Bluetooth® and data transfers greater than one megabyte should be transferred using Wi-Fi. However, if Bluetooth® is not available, but Wi-Fi and cellular are available (e.g., wearable device 202 is currently connected via cellular), communication selection module 202 may configure the threshold such that data transfers of less than ten megabytes should be transferred using cellular and data transfers greater than ten megabytes should be transferred using Wi-Fi. In yet another example, if Bluetooth® and cellular are available, but Wi-Fi is not available, communication selection module 202 may configure the threshold such that data transfers of less than three megabytes should be transferred using Bluetooth and data transfers greater than three megabytes should be transferred using cellular. The threshold values provided are only examples and any threshold value that may enable wearable device 202 to reduce the total power required to transfer the data may be used.

If payload determination module 256 determines that the predicted size of the data transfer is not greater than a threshold amount of data ("NO" branch of 504), power management module 210 determines that it is more power efficient to transfer the data using the established Bluetooth® connection and wearable device transfers the data using Bluetooth® (506). If payload determination module 256 that the predicted size of the data transfer is greater than the threshold amount of data ("YES") branch of 504, power management module 210 determines that it is more power efficient to transfer the data using Wi-Fi, connection determination module 258 determine whether a Wi-Fi connection is available (508). If there is Wi-Fi available ("YES" branch of 508), communication selection module 256 establishes the Wi-Fi connection, if needed, and wearable device 202 transfers the data using Wi-Fi (510).

If there is no Wi-Fi connection available ("NO" branch of 508), communication selection module 212 determines whether to transfer the data using a cellular connection (512). For example, if wearable device 202 has an unlimited cellular data plan and power management module 210 predicts that it will require less power to transfer the data using cellular than using Bluetooth® ("YES" branch of 512), communication selection module 212 may determine to transfer the data using cellular and wearable device 202 may transfer the data using cellular (514). However, if transferring data using cellular data is monetarily expensive and/or if power management module 210 predicts that it will require less power to transfer the data using Bluetooth® than cellular ("NO" branch of 512), communication selection module 212 may determine to transfer the data using Bluetooth® and wearable device 202 may transfer the data using Bluetooth® (506).

EXAMPLE 1

A method comprising: predicting, by a wearable device, an amount of data to be transferred from a computing device; determining, by the wearable device, based on the amount of data, a particular wireless communication technology from a plurality of wireless communication technologies of the wearable computing device predicted to use the least amount of power for transferring the data; determining, by the wearable device, whether the wearable device can connect to the computing device using the particular wireless communication technology; and, responsive to determining that the wearable device can connect to the computing device using the particular wireless communication technology, transferring, by the wearable device and using the particular wireless communication technology, the data.

EXAMPLE 2

The method of example 1, wherein predicting the amount of data to be transferred is based on one or more of a type of the data, header information of at least one packet of the data, an application associated with the data transfer, a priority assigned to the data being transferred, and an amount of bandwidth requested by the application associated with the data transfer.

EXAMPLE 3

The method of any of examples 1-2, wherein the particular wireless communication technology is a first wireless communication technology, the method further comprising: responsive to determining that the wearable device cannot connect to the computing device using the first wireless communication technology: determining, by the wearable device, a second wireless communication technology predicted to use a lowest amount of power of the plurality of wireless communication technologies other than the first wireless communication technology; and transferring, by the wearable computing device, the data using the second wireless communication technology.

EXAMPLE 4

The method of any of examples 1-3, further comprising: while transferring the data: determining, by the wearable device, whether a different one of the wireless communication technologies is predicted to use less power to transfer a remaining portion of the data than the particular wireless communication technology; and responsive to determining that the different wireless communication technology from the wireless communication technologies is predicted to use less power to transfer the remaining portion of the data, transferring, by the wearable device, the remaining portion of the data using the different the wireless communication.

EXAMPLE 5

The method of any of examples 1-4, wherein: the particular wireless communication technology uses less power to transfer a particular amount of data than one or more other wireless communication technologies from the plurality of wireless communication technologies, and the particular wireless communication technology uses more power to establish and maintain the connection to the computing device than at least one other wireless communication technology of the plurality of communication technologies.

EXAMPLE 6

The method of any of examples 1-5, wherein the particular wireless communication technology is one of Bluetooth, Wi-Fi, and cellular.

EXAMPLE 7

A method comprising: determining, by a wearable device, whether the wearable device is connected to a computing device using a first wireless communication technology from a plurality of wireless communication technologies of the wearable device; responsive to determining that the wearable device is not connected to the computing device using the first wireless communication technology, determining, by the wearable device, whether the wearable device is currently being worn; responsive to determining that the wearable device is currently being worn: determining, by the wearable device, whether the wearable device can connect to the computing device using a second wireless communication technology from the plurality of wireless communication technologies, wherein the first wireless communication technology uses less power to establish and maintain a connection with the computing device than the second wireless communication technology; and responsive to determining that the wearable device can connect to the computing device using the second wireless communication technology, establishing, by the wearable device, a connection to the network using the second wireless communication technology.

EXAMPLE 8

The method of example 7, further comprising: responsive to determining that the wearable device is connected to the computing device using the first wireless communication technology: predicting, by a wearable device, an amount of data to be transferred from the computing device; determining, by the wearable device, based on the amount of data, that the second wireless communication technology is predicted to use less power to transfer the data than the first wireless communication technology; and responsive to determining that the second wireless communication technology is predicted to use less power to transfer the data, transferring, by the wearable device and using the second wireless communication technology, the data.

EXAMPLE 9

The method of any of examples 7-8, further comprising: responsive to determining that the wearable device is not being worn, monitoring, by the wearable device, for a connection to the computing device using the first wireless communication technology.

EXAMPLE 10

The method of any of examples 7-9, further comprising: responsive to determining that the wearable device cannot connect to the computing device using the second wireless communication technology, determining, by the wearable device, whether the wearable device can connect to the computing device using a third wireless communication technology, wherein the second wireless communication technology uses less power to establish and maintain a connection with the computing device than the third wireless communication technology; and responsive to determining that the wearable device can connect to the computing device using the third wireless communication technology: establishing, by the wearable device, the connection to the computing device using the third wireless communication technology; and configuring a radio associated with the second wireless communication technology to operate in a reduced power mode.

EXAMPLE 11

The method of any of examples 7-10, further comprising: determining, by the wearable device, a rate at which power is being used by the wearable device; predicting, by the wearable device, a future time at which the wearable device is going to be connected to a charger; and responsive to predicting, based on the rate at which power is being used by the wearable device and the future time, that a power component of the wearable device is going to run out of power prior to the future time, disabling all wireless communication technology radios other than a radio for the first wireless communication technology.

EXAMPLE 12

The method of any of examples 7-11, wherein the first communication technology is Bluetooth and wherein the second wireless communication technology is one of Wi-Fi and cellular.

EXAMPLE 13

A wearable device comprising: one or more processors; a plurality of communication components each associated with a respective wireless communication technology, wherein at least a first communication component from the plurality of communication components is active, and wherein at least a second communication component from the plurality of communication components is inactive; one or more motion sensors configured to detect motion of the wearable device and generate, based on the detected motion, motion data; a storage device configured to store at least one module operable by the one or more processors to: determine whether the wearable device is connected to a computing device using the first communication component; responsive to determining that the wearable device is not connected to the computing device using the first communication technology, determine, based on the motion data, whether the wearable device is currently being worn; responsive to determining that the wearable device is currently being worn: activate the second communication component; determine whether the wearable device can connect to the computing device using the second communication component, wherein the first communication component uses less power to establish and maintain a wireless connection with the computing device than the second communication component; and responsive to determining that the wearable device can connect to the computing device using the second communication component, establish the wireless connection to the computing device using the second communication component.

EXAMPLE 14

The wearable device of example 13, wherein the at least one module is further operable by the one or more processors to: responsive to determining that the wearable device is connected to the computing device using the first communication component: predict an amount of data to be transferred from the computing device; determine, based on the amount of data, that the second communication component is predicted to use less power to transfer the data than the first communication component; and responsive to determining that the second communication component is predicted to use less power to transfer the data, transfer, and using the second communication component, the data.

EXAMPLE 15

The wearable device of example 14, wherein the at least one module is further operable by the one or more processors to predict the amount of data to be transferred based on one or more of a type of the data, header information of at least one packet of the data, an application associated with the data transfer, a priority assigned to the data being transferred, and an amount of bandwidth requested by the application associated with the data transfer.

EXAMPLE 16

The wearable device of any of examples 14-15, wherein the at least one module is further operable by the one or more processors to: responsive to determining that the wearable device cannot connect to the computing device using the first communication component: determine that the second communication component is predicted to use a lowest amount of power of the plurality of communication components other than the first communication component; and transfer the data using the second communication component.

EXAMPLE 17

The wearable device of example 16, wherein: the first communication component uses less power to transfer a particular amount of data than the second communication component, and the first communication component uses more power to establish and maintain the connection to the computing device than the second communication component.

EXAMPLE 18

The wearable device of any of examples 13-17, wherein the at least one module is further operable by the one or more processors to: determine whether the wearable device is connected to a charger; and responsive to determining that the wearable device is connected to the charger, connect to the computing device using the second communication component.

EXAMPLE 19

The wearable device of any of examples 13-18, wherein the at least one module is further operable by the one or more processors to: responsive to determining that the wearable device cannot connect to the computing device using the second communication component, determine whether the wearable device can connect to the computing device using a third communication component, wherein the second communication component uses less power to establish and maintain a connection with the computing device than the third communication component; and responsive to determining that the wearable device can connect to the computing device using the third communication component: establish the wireless connection to the computing device using the third communication component; and deactivate the second communication component.

EXAMPLE 20

The wearable device of any of examples 133-198, further comprising: a power component configured to store power, wherein the at least one module is further operable by the one or more processors to: determine a rate at which power is being used by the wearable device; predict a future time at which the wearable device is going to be connected to a charger; and responsive to predicting, based on the rate at which power is being used by the wearable device and the future time, that the power component is going to run out of the power prior to the future time, disabling the plurality of communication components other than a the first communication component.

In one or more examples, the operations described may be implemented in hardware, software, firmware, or any combination thereof If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory and does not include a signal or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
selecting, by a wearable device, a first wireless communication technology from a plurality of wireless communication technologies of the wearable device predicted to use a least amount of power to transfer an amount of data to the wearable device from another device;
determining whether the wearable device can connect to the other device using the first wireless communication technology;
responsive to determining that the wearable device can connect to the other device using the first wireless communication technology, transferring, by the wearable device and using the first wireless communication technology, the data from the other device; and
while transferring the data:
determining, by the wearable device, whether a second wireless communication technology from the plurality of wireless communication technologies is predicted to use less power to transfer a remaining portion of the data than the first wireless communication technology; and
responsive to determining that the second wireless communication technology from the wireless communication technologies is predicted to use less power to transfer the remaining portion of the data, transferring, by the wearable device, the remaining portion of the data using the second wireless communication technology.

2. The method of claim 1, further comprising:
predicting the amount of data to be transferred based on one or more of a type of the data, header information of at least one packet of the data, an application associated with the transferring of the data, a priority assigned to the data being transferred, and an amount of bandwidth requested by the application associated with the transferring of the data.

3. The method of claim 1, further comprising:
responsive to determining that the wearable device cannot connect to the other device using the first wireless communication technology:

determining, by the wearable device, a different wireless communication technology predicted to use a least amount of power of the plurality of wireless communication technologies other than the first wireless communication technology; and transferring, by the wearable device, the data from the other device using the different wireless communication technology.

4. The method of claim 1, wherein:

the first wireless communication technology uses less power to transfer a particular amount of data than one or more other wireless communication technologies from the plurality of wireless communication technologies, and the first wireless communication technology uses more power to establish and maintain the connection to the other device than at least one other wireless communication technology of the plurality of communication technologies.

5. The method of claim 1, wherein the first wireless communication technology is one of Bluetooth, Wi-Fi, and cellular.

6. A method comprising:

generating, by a wearable device and based on motion detected by one or more motion sensors of the wearable device, motion data;

determining, by the wearable device and based on the motion data, whether the wearable device is currently being worn;

responsive to determining that the wearable device is currently being worn:

determining, by the wearable device, whether the wearable device can connect to a computing device using a first wireless communication technology from a plurality of wireless communication technologies, wherein a communication component associated with the first wireless communication technology uses less power to establish and maintain a connection with the computing device than a communication component associated with a second wireless communication technology from the plurality of wireless communication technologies; and responsive to determining that the wearable device can connect to the computing device using the first wireless communication technology:

establishing, by the wearable device, a connection to a network using the first wireless communication technology; and disabling the communication component associated with the second wireless communication technology;

predicting, by the wearable device, an amount of data to be transferred from the computing device to the wearable device;

determining, by the wearable device, based on the amount of data, that the second wireless communication technology is predicted to use less power to transfer the data than the first wireless communication technology; and responsive to determining that the second wireless communication technology is predicted to use less power to transfer the data, transferring, by the wearable device and using the second wireless communication technology, the data from the computing device.

7. The method of claim 6, further comprising:

responsive to determining that the wearable device is not being worn, monitoring, by the wearable device, for a connection to the computing device using the first wireless communication technology.

8. The method of claim 6, further comprising:

responsive to determining that the wearable device cannot connect to the computing device using the first wireless communication technology, determining, by the wearable device, whether the wearable device can connect to the computing device using the second wireless communication technology from the plurality of wireless communication technologies; and responsive to determining that the wearable device can connect to the computing device using the second wireless communication technology:

establishing, by the wearable device, the connection to the computing device using the second wireless communication technology; and configuring the communication component associated with the first wireless communication technology to operate in a reduced power mode.

9. The method of claim 6, further comprising:

determining, by the wearable device, a rate at which power is being used by the wearable device;

predicting, by the wearable device, a future time at which the wearable device is going to be connected to a charger; and responsive to predicting, based on the rate at which power is being used by the wearable device and the future time, that a power component of the wearable device is going to run out of power prior to the future time, disabling all communication components associated with the plurality of wireless communication technologies other than the communication component for the first wireless communication technology.

10. The method of claim 8, wherein the first communication technology is Bluetooth and wherein the second wireless communication technology is one of Wi-Fi and cellular.

11. A wearable device comprising:

one or more processors;

a plurality of communication components each associated with a respective wireless communication technology from a plurality of wireless communication technologies; and a storage device configured to store at least one module operable by the one or more processors to:

select a first wireless communication technology from the plurality of wireless communication technologies predicted to use a least amount of power to transfer an amount of data from another device;

determine whether the wearable device can connect to the other device using the first wireless communication technology;

responsive to determining that the wearable device can connect to the other device using the first wireless communication technology, transfer the data from the other device and to the wearable device using the communication component associated with first wireless communication technology; and while transferring the data:

determine whether a second wireless communication technology from the wireless communication technologies is predicted to use less power to transfer a remaining portion of the data than the first wireless communication technology; and responsive to determining that the second wireless communication technology from the wireless communication technologies is predicted to use less power to transfer the remaining portion of the data, transfer the remaining portion of the data using the second wireless communication technology.

12. The wearable device of claim 11, wherein the at least one module is further operable by the one or more processors to:
predict the amount of data to be transferred based on one or more of a type of the data, header information of at least one packet of the data, an application associated with the transferring of the data, a priority assigned to the data being transferred, and an amount of bandwidth requested by the application associated with the transferring of the data.

13. The wearable device of claim 11, wherein the at least one module is further operable by the one or more processors to:
responsive to determining that the wearable device cannot connect to the other device using the first wireless communication technology:
determine a different wireless communication technology predicted to use a lowest amount of power of the plurality of wireless communication technologies other than the first wireless communication technology; and
transfer the data to the other device using a communication component associated with the different wireless communication technology.

14. The wearable device of claim 11, wherein:
the communication component associated with the first wireless communication technology uses less power to transfer a particular amount of data than one or more other communication components from the plurality of communication components, and
the communication component associated with the first wireless communication technology uses more power to establish and maintain the connection to the other device than at least one other communication component from the plurality of communication components.

15. The wearable device of claim 11, further comprising:
one or more motion sensors configured to detect motion of the wearable device and generate, based on the detected motion, motion data,
wherein the at least one module is further operable by the one or more processors to:
determine, based on the motion data, whether the wearable device is currently being worn;
responsive to determining that the wearable device is currently being worn:
determine whether the wearable device is connected to the other device using the communication component associated with the second wireless communication technology, wherein the communication component associated with the second wireless communication technology uses less power to establish and maintain a connection with the other device than the communication component associated with the first wireless communication technology; and
responsive to determining that the wearable device is connected to the other device using the communication component associated with the second wireless communication technology, disable the communication component associated with the first wireless communication technology.

16. The wearable device of claim 11, wherein the at least one module is further operable by the one or more processors to:
responsive to determining that the wearable device cannot connect to the other device using the communication component associated with the first wireless communication technology, determine whether the wearable device can connect to the other device using the communication component associated with the second wireless communication technology from the plurality of wireless communication technologies, wherein the communication component associated with the first wireless communication technology uses less power to establish and maintain a connection with the other device than the communication component associated with the second wireless communication technology; and
responsive to determining that the wearable device can connect to the other device using the second wireless communication technology:
establish the connection to the other device using the communication component associated with the second wireless communication technology; and
configuring the communication component associated with the first wireless communication technology to operate in a reduced power mode.

17. The wearable device of claim 11, further comprising:
a power component configured to store power,
wherein the at least one module is further operable by the one or more processors to:
determine a rate at which power is being used by the wearable device;
predict a future time at which the wearable device is going to be connected to a charger; and
responsive to predicting, based on the rate at which power is being used by the wearable device and the future time, that the power component of the wearable device is going to run out of power prior to the future time, disable all communication components other than the communication component associated with the first wireless communication technology.

* * * * *